United States Patent
Jiang et al.

(10) Patent No.: US 11,582,470 B2
(45) Date of Patent: Feb. 14, 2023

(54) METHOD AND APPARATUS FOR MULTI-SCALE NEURAL IMAGE COMPRESSION WITH INTRA-PREDICTION RESIDUALS

(71) Applicant: TENCENT AMERICA LLC, Palo Alto, CA (US)

(72) Inventors: Wei Jiang, Sunnyvale, CA (US); Wei Wang, San Jose, CA (US); Ding Ding, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/333,319

(22) Filed: May 28, 2021

(65) Prior Publication Data
US 2022/0070477 A1 Mar. 3, 2022

Related U.S. Application Data

(60) Provisional application No. 63/074,405, filed on Sep. 3, 2020.

(51) Int. Cl.
*H04N 19/30* (2014.01)
*H04N 19/149* (2014.01)
(Continued)

(52) U.S. Cl.
CPC .............. *H04N 19/30* (2014.11); *G06N 3/08* (2013.01); *H04N 19/149* (2014.11); *H04N 19/159* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 2016/0014422 A1* | 1/2016 | Su | H04N 19/124 375/240.03 |
| 2018/0249158 A1 | 8/2018 | Huang et al. | |

(Continued)

OTHER PUBLICATIONS

International Search Report dated Sep. 15, 2021 in Application No. PCT/US2021/37398.

(Continued)

*Primary Examiner* — Mohammad J Rahman
(74) *Attorney, Agent, or Firm* — Sughrue Mion, PLLC (57) ABSTRACT

A method of multi-scale neural image compression with intra-prediction residuals is performed by at least one processor and includes downsampling an input image, generating a current predicted image, based on a previously-recovered predicted image, and generating a prediction residual based on a difference between the downsampled input image and the generated current predicted image. The method further includes encoding the generated prediction residual, decoding the encoded prediction residual, and generating a currently-recovered predicted image based on an addition of the current predicted image and the decoded prediction residual. The method further includes upsampling the currently-recovered predicted image, generating a scale residual based on a difference between the input image and the upsampled currently-recovered predicted image, and encoding the scale residual.

20 Claims, 9 Drawing Sheets

(51) Int. Cl.
*H04N 19/159* (2014.01)
*H04N 19/176* (2014.01)
*G06N 3/08* (2006.01)

(56) References Cited

U.S. PATENT DOCUMENTS

| | | |
|---|---|---|
| 2019/0075301 A1 | 3/2019 | Chou et al. |
| 2019/0272634 A1* | 9/2019 | Li .................... A61B 34/35 |
| 2020/0145661 A1 | 5/2020 | Jeon et al. |
| 2020/0311870 A1* | 10/2020 | Jung .................... G06T 3/4046 |
| 2021/0281878 A1* | 9/2021 | Chan .................... H04N 19/59 |

OTHER PUBLICATIONS

Written Opinion of the International Searching Authority dated Sep. 15, 2021 in Application No. PCT/US2021/37398.
Extended European Search Report dated Nov. 3, 2022 in European Application No. 21864850.9.
Jens Rainer OHM, "7.5 Scalable video coding" In: "Multimedia Signal Coding and Transmission", 2015, Springer, pp. 422-434 (13 pages total).
Dong Liu et al., "Deep Learning-Based Technology in Responses to the Joint Call for Proposals on Video Compression With Capability Beyond HEVC", IEEE Transactions on Circuits and Systems for Video Technology, May 5, 2020, vol. 30, No. 5, pp. 1267-1280 (14 pages total).
Haisheng Fu et al., "An Extended Hybrid Image Compression Based on Soft-to-Hard Quantification", IEEE Access, May 21, 2020, vol. 8, pp. 95832-95842 (11 pages total).

\* cited by examiner

METHOD AND APPARATUS FOR MULTI-SCALE NEURAL IMAGE COMPRESSION WITH INTRA-PREDICTION RESIDUALS

CROSS-REFERENCE TO RELATED APPLICATION

This application is based on and claims priority to U.S. Provisional Patent Application No. 63/074,405, filed on Sep. 3, 2020, in the U.S. Patent and Trademark Office, the disclosure of which is incorporated by reference herein in its entirety.

BACKGROUND

ISO/IEC MPEG (JTC 1/SC 29/WG 11) has been actively searching for potential needs for standardization of future video coding technology. ISO/IEC JPEG has established JPEG-AI group focusing on AI-based end-to-end neural image compression using deep neural networks (DNNs). The success of recent approaches has brought more and more industrial interests in advanced neural image and video compression methodologies.

Given an input image x, the target of neural image compression (NIC) is to use the image x as the input to a DNN encoder to compute a compressed representation $\bar{y}$ that is compact for storage and transmission, and then, use $\bar{y}$ as the input to a DNN decoder to reconstruct an image $\bar{x}$. Previous NIC methods take a variational autoencoder (VAE) structure, in which the DNN encoders directly use the entire image x as its input, which is passed through a set of network layers that work like a black box to compute the output representation $\bar{y}$. Correspondingly, the DNN decoders take the entire representation $\bar{y}$ as its input, which is passed through another set of network layers that work like another black box to compute the reconstructed $\bar{x}$.

Instead of directly encoding the original whole image, the block-based intra-prediction and residual coding mechanism has been proven highly effective for compressing image frames in modern video coding standards like High Efficiency Video Coding (HEVC) and Versatile Video Coding (VVC). The entire images are partitioned into blocks of various sizes, and a prediction block is generated by copying the boundary pixels of previous compressed blocks along a variety of angular directions. Then, the residuals between the original block and the prediction block are compressed. Residuals can be much more efficiently encoded than the original pixels, and better coding performance can be achieved.

Multi-scale processing is another effective mechanism to improve the efficiency of learned image representation for image reconstruction tasks like NIC. By using different coding strategies at different scales, better encoding performance can be achieved.

SUMMARY

According to embodiments, a method of multi-scale neural image compression with intra-prediction residuals is performed by at least one processor and includes downsampling an input image, generating a current predicted image, based on a previously-recovered predicted image, and generating a prediction residual based on a difference between the downsampled input image and the generated current predicted image. The method further includes encoding the generated prediction residual, decoding the encoded prediction residual, and generating a currently-recovered predicted image based on an addition of the current predicted image and the decoded prediction residual. The method further includes upsampling the currently-recovered predicted image, generating a scale residual based on a difference between the input image and the upsampled currently-recovered predicted image, and encoding the scale residual.

According to embodiments, an apparatus for multi-scale neural image compression with intra-prediction residuals includes at least one memory configured to store program code, and at least one processor configured to read the program code and operate as instructed by the program code. The program code includes downsampling code configured to cause the at least one processor to downsample an input image, first generating code configured to cause the at least one processor to generate a current predicted image, based on a previously-recovered predicted image, and second generating code configured to cause the at least one processor to generate a prediction residual based on a difference between the downsampled input image and the generated current predicted image. The program code further includes first encoding code configured to cause the at least one processor to encode the generated prediction residual, first decoding code configured to cause the at least one processor to decode the encoded prediction residual, and third generating code configured to cause the at least one processor to generate a currently-recovered predicted image based on an addition of the current predicted image and the decoded prediction residual. The program code further includes upsampling code configured to cause the at least one processor to upsample the currently-recovered predicted image, fourth generating code configured to cause the at least one processor to generate a scale residual based on a difference between the input image and the upsampled currently-recovered predicted image, and second encoding code configured to cause the at least one processor to encode the scale residual.

According to embodiments, a non-transitory computer-readable medium storing instructions that, when executed by at least one processor for multi-scale neural image compression with intra-prediction residuals, cause the at least one processor to downsample an input image, generate a current predicted image, based on a previously-recovered predicted image, and generate a prediction residual based on a difference between the downsampled input image and the generated current predicted image. The instructions, when executed by the at least one processor, further cause the at least one processor to encode the generated prediction residual, decode the encoded prediction residual, and generate a currently-recovered predicted image based on an addition of the current predicted image and the decoded prediction residual. The instructions, when executed by the at least one processor, further cause the at least one processor to upsample the currently-recovered predicted image, generate a scale residual based on a difference between the input image and the upsampled currently-recovered predicted image, and encode the scale residual.

DETAILED DESCRIPTION

The disclosure describes an NIC framework for compressing an input image by a DNN, using multi-scale residuals from block-based intra-prediction.

Figure 1:
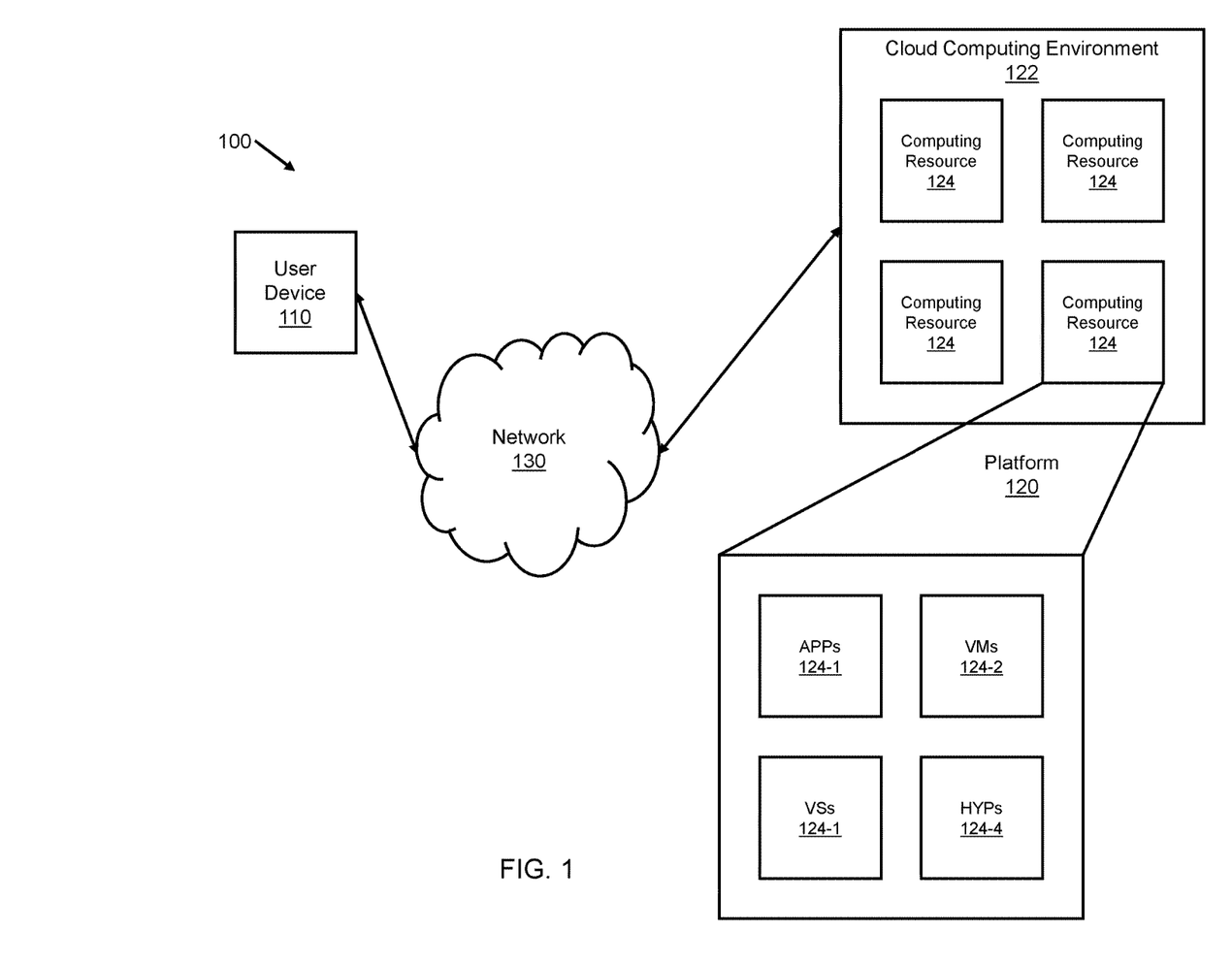
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
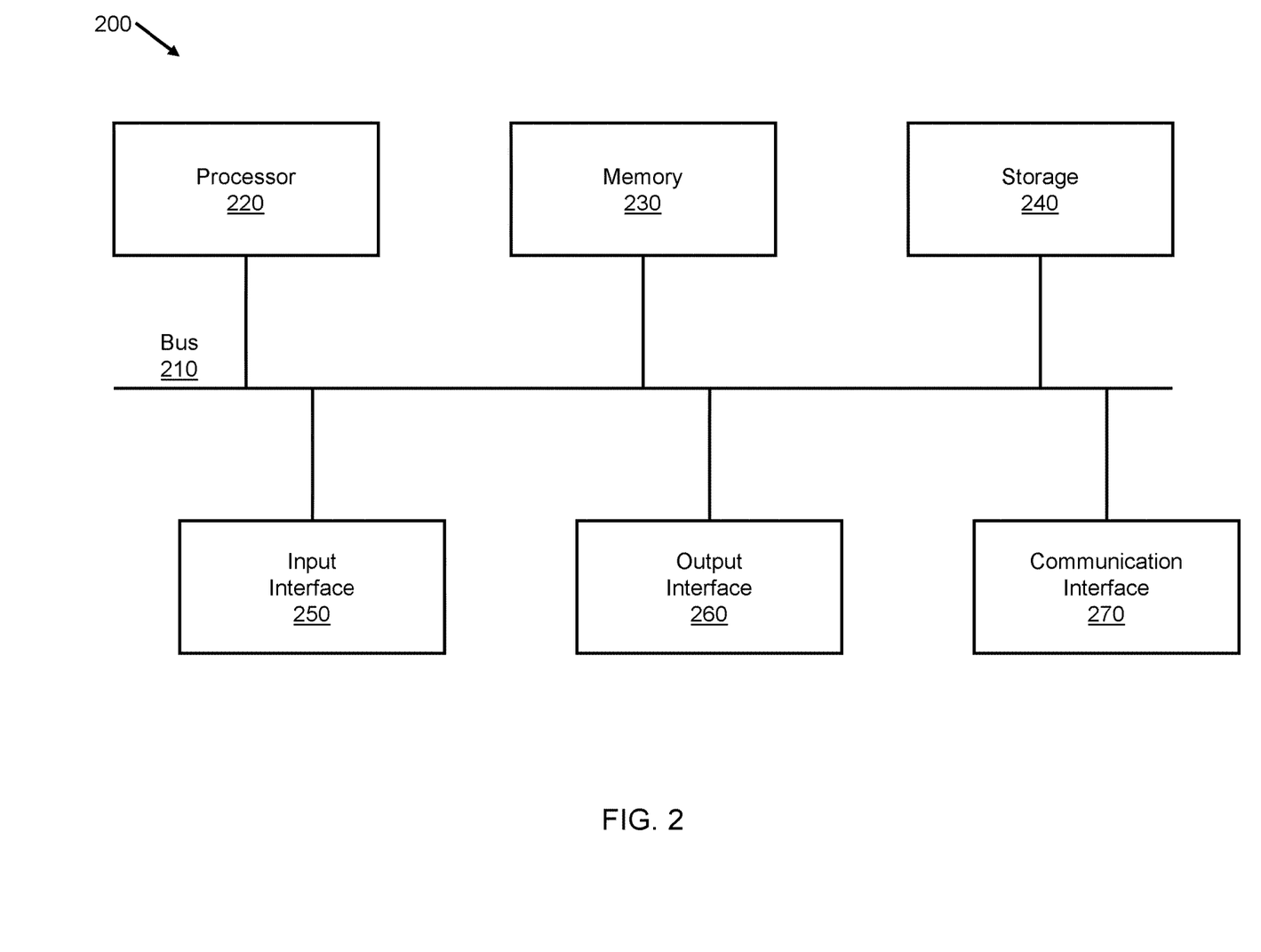
FIG. 2 is a block diagram of example components of one or more devices of FIG.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage 240, an input interface 250, an output interface 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage 240 stores information and/or software related to the operation and use of the device 200. For example, the storage 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input interface 250 includes a component that permits the device 200 to receive information, such as via user input (e.g., a touch screen display, a keyboard, a keypad, a mouse, a button, a switch, and/or a microphone). Additionally, or alternatively, the input interface 250 may include a sensor for sensing information (e.g., a global positioning system (GPS) component, an accelerometer, a gyroscope, and/or an actuator). The output interface 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage 240. A computer-readable medium is defined herein as a non-transitory memory device. A memory device includes memory space within a single physical storage device or memory space spread across multiple physical storage devices.

Software instructions may be read into the memory 230 and/or the storage 240 from another computer-readable medium or from another device via the communication interface 270. When executed, software instructions stored in the memory 230 and/or the storage 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Methods and apparatuses for multi-scale neural image compression with intra-prediction residuals will now be described in detail.

Embodiments described herein include a multi-scale block-based intra-prediction and residual coding framework for NIC. Two mechanisms are used: encoding residuals between prediction blocks and original blocks instead of encoding original pixels; and using different coding strategies at different scales, to largely improve NIC coding efficiency.

Figure 3:
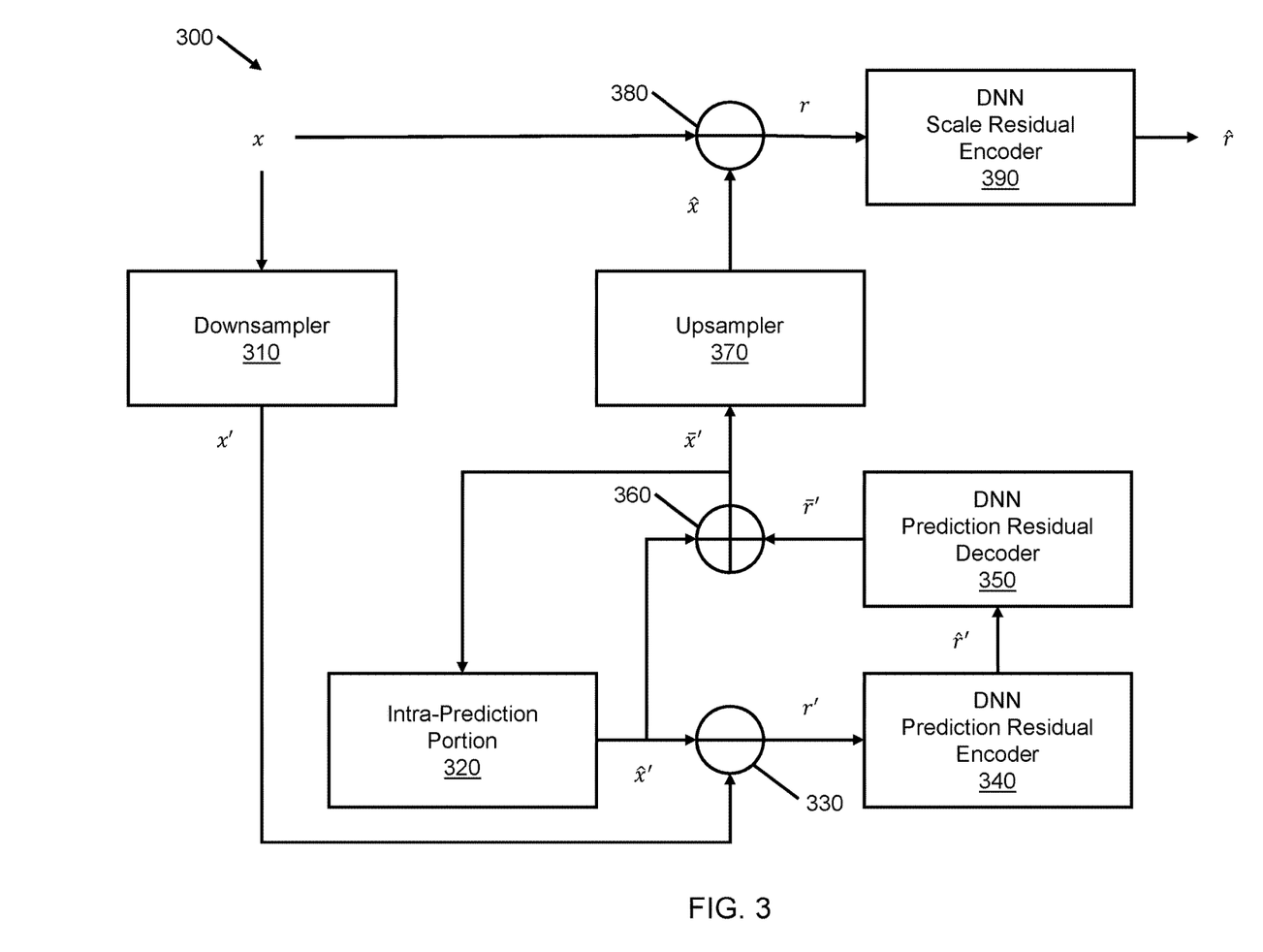
FIG. 3 is a block diagram of an encoder for multi-scale neural image compression with intra-prediction residuals, according to embodiments.
Figure 4:
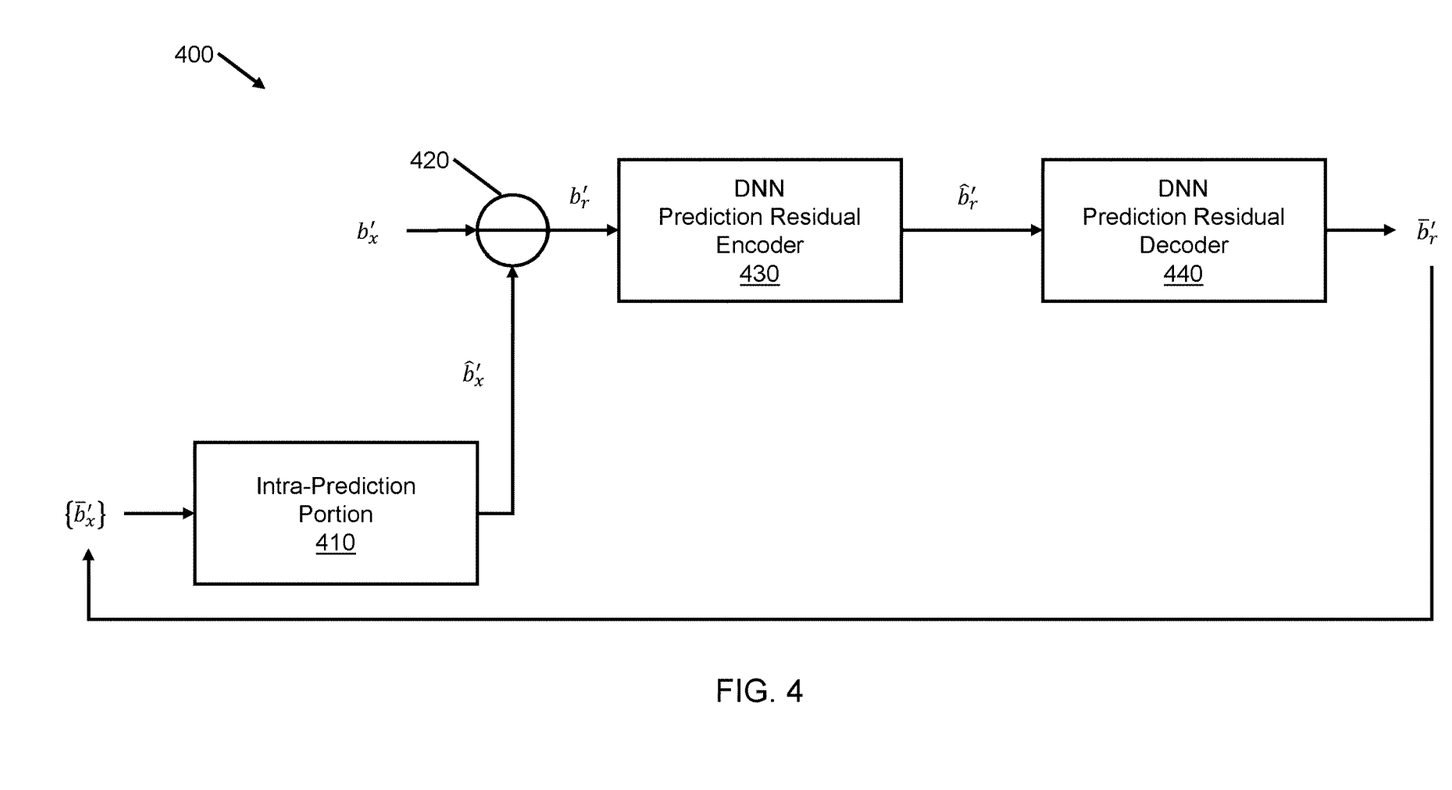
FIG. 4 is block diagram of an apparatus for block-based intra-prediction, according to embodiments.
Figure 5:
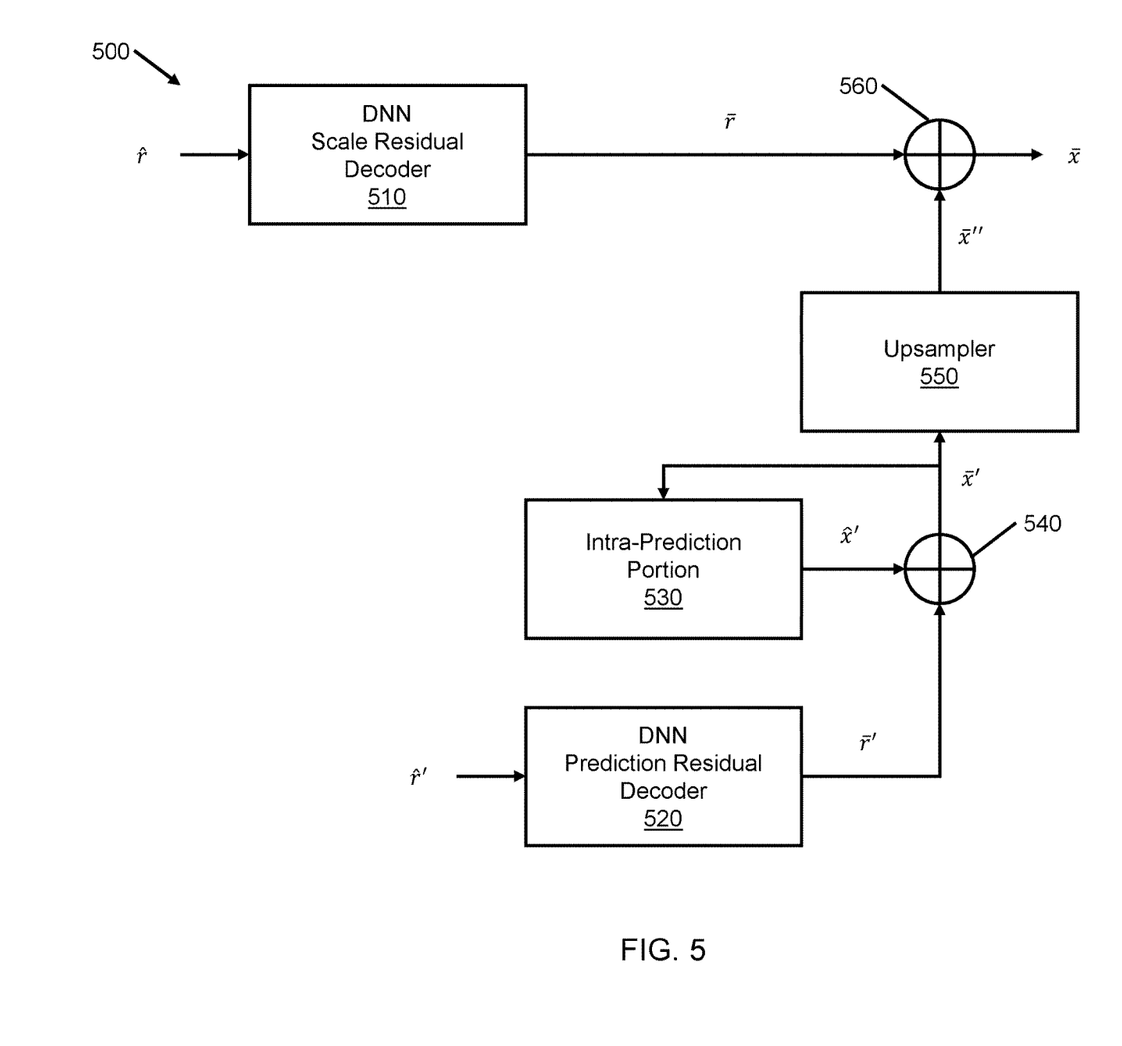
FIG. 5 is a block diagram of a decoder for multi-scale neural image compression with intra-prediction residuals, according to embodiments.

FIG. 3 is a block diagram of an encoder 300 for multi-scale neural image compression with intra-prediction residuals, according to embodiments. FIG. 4 is block diagram of an apparatus 400 for block-based intra-prediction, according to embodiments. FIG. 5 is a block diagram of a decoder 500 for multi-scale neural image compression with intra-prediction residuals, according to embodiments.

As shown in FIG. 3, the encoder 300 includes a downsampler 310, an intra-prediction portion 320, a subtractor 330, a DNN prediction residual encoder 340, a DNN prediction residual decoder 350, an adder 360, an upsampler 370, a subtractor 380 and a DNN scale residual encoder 390.

On an encoder side, the downsampler 310 downsamples an input image x to generate a downsampled image x'. A previously-recovered predicted image $\bar{x}'$ is passed through the intra-prediction portion 320 to generate a predicted image $\hat{x}'$. The subtractor 330 generates a prediction residual r', which is difference between the downsampled image x' and the predicted image $\hat{x}'$.

The DNN prediction residual encoder 340 encodes the prediction residual r' to generate an encoded prediction residual $\hat{r}'$. The encoded prediction residual $\hat{r}'$ is passed through the DNN prediction residual decoder 350 to generate a decoded prediction residual $\bar{r}'$. The adder 360 adds the decoded prediction residual $\bar{r}'$ back to predicted image $\hat{x}'$ to generate a newly-recovered or currently-recovered predicted image $\bar{x}'$.

The upsampler 370 upsamples the recovered predicted image $\bar{x}''$ to generate an upsampled image $\hat{x}$. The subtractor 380 generates a scale residual r, which is a difference between the original input image x and the upsampled image $\hat{x}$. The DNN scale residual encoder 390 encodes the scale residual r to generate an encoded scale residual $\hat{r}$.

In embodiments, the downsampler 310 uses a downsampling DNN including both convolution and pooling layers to generate the downsampled image x' from the input image x. The upsampler 370 uses an upsampling DNN to generate an output higher scale signal from an input lower scale signal. The upsampling DNN may include a few deconvolution layers. In embodiments, any of more complex DNNs such as ones used for image super-resolution can also be used as the upsampling DNN.

In embodiments, the intra-prediction portion 320 uses a block-wise intra-prediction mechanism. The downsampled image x' (and the corresponding prediction residual r') is partitioned into multiple blocks, and the DNN prediction residual encoder 340 processes these blocks one by one based on a predefined scan order.

As shown in FIG. 4, the apparatus 400 for block-based intra-prediction includes an intra-prediction portion 410, a subtractor 420, a DNN prediction residual encoder 430 and a DNN prediction residual decoder 440.

Given a set of previously-reconstructed or previously-recovered predicted blocks $\{\bar{b}_x'\}$, the intra-prediction portion 410 (a prediction DNN) generates a current predicted block $\hat{b}_x'$ of the predicted image $\hat{x}'$. The subtractor 420 subtracts the current predicted block $\hat{b}_x'$ from a true image block $b_x'$ of the downsampled input image x' to generate a corresponding prediction residual block $b_r'$ of prediction residual r'. The prediction DNN may include a few convolution and deconvolution layers. For example, the DNN used by image super-resolution can be used here, e.g., by changing an output size to be the same with an input size.

The residual block $b_r'$ is passed through the DNN prediction residual encoder 430 to generate an encoded prediction residual block $\hat{b}_r'$ of the encoded prediction residual $\hat{r}'$. The encoded prediction residual block $\hat{b}_r'$ is passed through the DNN prediction residual decoder 440 to generate a decoded prediction residual block $\bar{b}_r'$ of the decoded prediction residual $\bar{r}'$. The decoded prediction residual block $\bar{b}_r'$ can be added back to the predicted block $\hat{b}_x'$ to generate a newly-recovered or newly-reconstructed block $\bar{b}_x'$ of the previously-recovered predicted image $\bar{x}'$. This newly-reconstructed block $\bar{b}_x'$ is then added into the set of previously-reconstructed blocks $\{\bar{b}_x'\}$, and the intra-prediction portion 410 processes a next block.

As shown in FIG. 5, the decoder 500 includes a DNN scale residual decoder 510, a DNN prediction residual decoder 520, an intra-prediction portion 530, an adder 540, an upsampler 550 and an adder 560.

On a decoder side, as described in FIG. 3, the DNN scale residual decoder 510, based on the encoded scale residual $\hat{r}$, generates the decoded scale residual $\bar{r}$. The DNN prediction residual decoder 520, based on the encoded prediction residual $\hat{r}'$, generates the decoded prediction residual $\bar{r}'$. The intra-prediction portion 530 generates the predicted image $\hat{x}'$.

The adder 540 adds the predicted image $\hat{x}'$ with the decoded prediction residual $\bar{r}'$ to generate the recovered predicted image $\bar{x}'$. The upsampler 550 upsamples the recovered predicted image using the upsampling DNN, to generate an upsampled image $\bar{x}''$. The adder 560 adds the upsampled image $\bar{x}''$ back to the decoded scale residual $\bar{r}$ to generate a final reconstructed image $\bar{x}$.

In embodiments, the intra-prediction portion 530 on the decoder side uses the same block-wise intra-prediction mechanism as the encoder side. Given a set of previously-reconstructed blocks $\{\bar{b}_x'\}$, the prediction DNN (the same as the encoder side) is used to generate a current predicted block $\hat{b}_x'$, which is added back to a decoded residual block $\bar{b}_r'$ of the decoded prediction residual $\bar{r}'$ to generate a reconstructed block $\bar{b}_x'$. This reconstructed block $\bar{b}_x'$ is then added into the set of previously-reconstructed blocks $\{\bar{b}_x'\}$, and the intra-prediction portion 530 processes a next block.

In embodiments, the DNN scale residual encoder 390 uses a scale residual encoding DNN to encode the residual r. The DNN prediction residual encoder 340 uses a prediction residual encoding DNN to encode the prediction residual r'. The DNN scale residual decoder 510 uses a scale residual decoding DNN to decode the encoded scale residual $\hat{r}$. The DNN prediction residual decoder 350 or 520 uses a prediction residual decoding DNN to decode encoded prediction residual $\hat{r}'$. The scale residual encoding DNN and the scale residual decoding DNN take the VAE structure, and the prediction residual encoding DNN and the prediction residual decoding DNN also take the VAE structure. The structure of the scale residual encoding/decoding DNN and the prediction residual encoding/decoding DNN can be different or be the same.

This disclosure does not put any restrictions on the network structures for the downsampling DNN, the upsampling DNN, the prediction DNN, the scale residual encoding/decoding DNN, and the prediction residual encoding/decoding DNN.

A target of a training process is to learn the downsampling DNN, the prediction DNN, the scale residual encoding DNN, the prediction residual encoding DNN, the upsampling DNN, the scale residual decoding DNN, and the prediction residual decoding DNN. In the training process, weight coefficients of the above DNNs to be learned are initialized, for example, using corresponding pre-trained DNN models, or by setting them to random numbers. Then, an input training image x is passed through an encoding process described in FIG. 3 to generate encoded residuals $\hat{r}$ and $\hat{r}'$, which will then be passed through a decoding process described in FIG. 5 to generate decoded residuals $\bar{r}$ and $\bar{r}'$ and a reconstructed image $\bar{x}$. For NIC, there are two competing targets: better reconstruction quality versus less bit consumption. A quality loss function $D(x, \bar{x})$ is used to measure the reconstruction quality, which may be called a distortion loss, such as a peak signal-to-noise ratio (PSNR), multi-scale structural similarity (MS-SSIM), or a weighted combination of both. A rate loss $R(\hat{r}, \hat{r}')$ is computed to measure bit consumption of compressed representations. Therefore, a trade-off hyperparameter $\lambda$ is used to optimize a joint rate-distortion (R-D) loss:

$$L(x,\bar{x},\hat{r}_1,\ldots,\hat{r},\hat{y}) = \lambda D(x,\bar{x}) + R(\hat{r},\hat{r}') + \beta E(\hat{r},\bar{r},\hat{r}',\bar{r}') \quad (1),$$

where $E(\hat{r}, \bar{r}, \hat{r}', \bar{r}')$ measures a distortion of decoded residuals compared with original residuals before encoding, which acts as regularization loss for the scale residual encoding/decoding DNNs and the prediction residual encoding/decoding DNNs. $\beta$ is a hyperparameter to balance an importance of the regularization loss.

Figure 6:
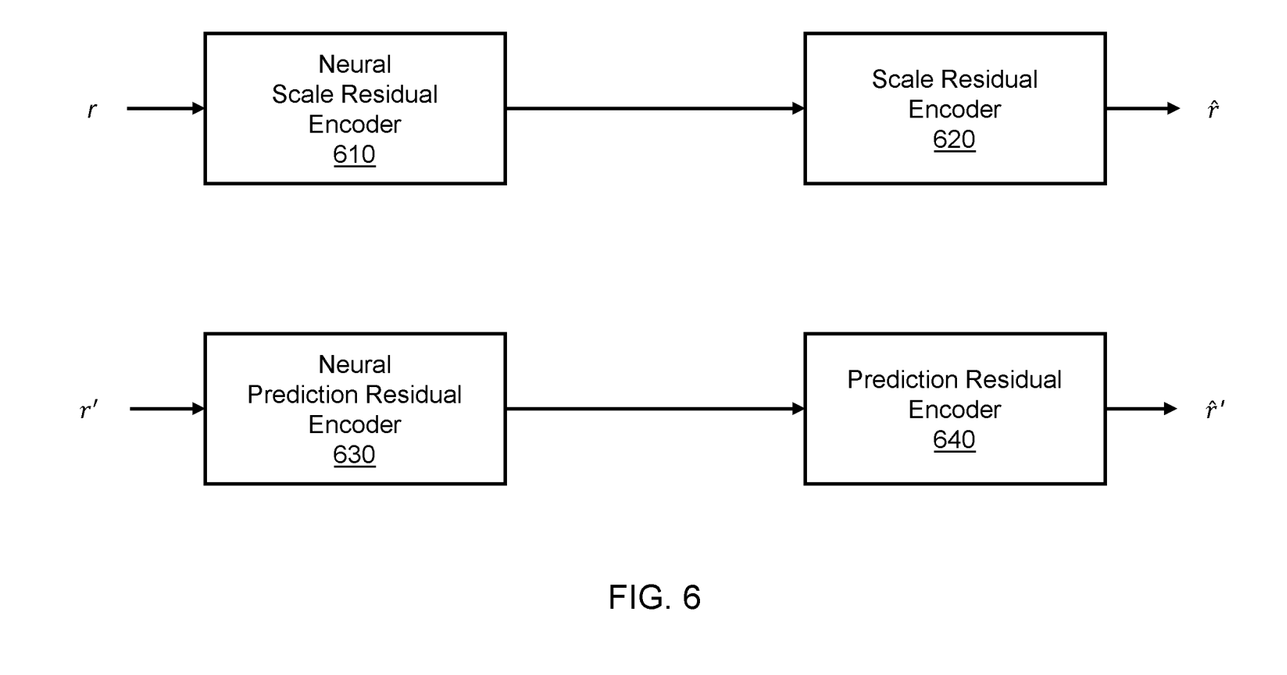
FIG. 6 is a block diagram of a decomposed scale residual encoding DNN and a decomposed prediction residual encoding DNN, according to embodiments.
Figure 7:
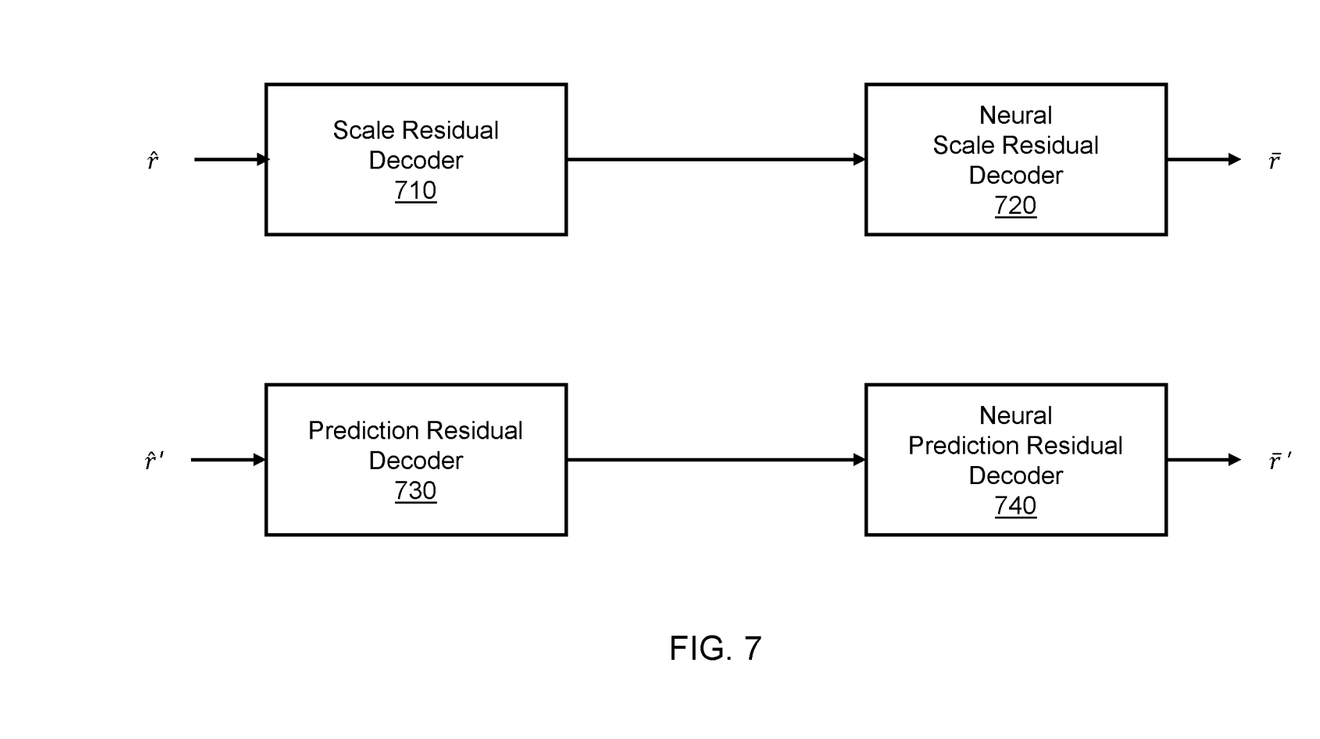
FIG. 7 is a block diagram of a decomposed scale residual decoding DNN and a decomposed prediction residual decoding DNN, according to embodiments.

FIG. 6 is a block diagram of a decomposed scale residual encoding DNN and a decomposed prediction residual encoding DNN, according to embodiments. FIG. 7 is a block diagram of a decomposed scale residual decoding DNN and a decomposed prediction residual decoding DNN, according to embodiments.

Training with a large hyperparameter $\lambda$ results in compression models with smaller distortion but more bit consumption, and vice versa. To learn weight coefficients of DNNs, the scale residual encoding DNN and the prediction residual encoding DNN are decomposed into two parts as shown in FIG. 6. Similarly, the scale residual decoding DNN and the prediction residual decoding DNN are decomposed into two parts as shown in FIG. 7.

As shown in FIG. 6, the scale residual encoding DNN is decomposed into a neural scale residual encoder 610 followed by a scale residual encoder 620. A corresponding processing module is also decomposed into a neural scale residual encoding module followed by a scale residual encoding module. Similarly, the prediction residual encoding DNN is decomposed into a neural prediction residual encoder 630 followed by a prediction residual encoder 640. A corresponding processing module is also decomposed into a neural prediction residual encoding module followed by a prediction residual encoding module.

In embodiments, the neural scale residual encoder 610 or the neural prediction residual encoder 630 is a DNN, which is learned during a training process and deployed at a test stage. The scale residual encoder 620 or the prediction residual encoder 640, on the other hand, is different for training and test. At the test stage, the scale residual encoder 620 or the prediction residual encoder 640 is an actual encoder, including a quantizer followed by an entropy encoder. While at the training stage, the scale residual encoder 620 or the prediction residual encoder 640 uses a statistic data sampler to approximate an effect of the actual quantizer, and the entropy encoder is skipped for training.

Similarly, as shown in FIG. 7, the scale residual decoding DNN is decomposed into a scale residual decoder 710 followed by a neural scale residual decoder 720. A corresponding processing module is also decomposed into a scale residual decoding module followed by a neural scale residual decoding module. The prediction residual decoding DNN is decomposed into a prediction residual decoder 730 followed by a neural prediction residual decoder 740. A corresponding processing module is also decomposed into a prediction residual decoding module followed by a neural prediction residual decoding module.

In embodiments, the neural scale residual decoder 720 or the neural prediction residual decoder 740 is an DNN, which is learned during the training process and deployed at the test stage. The scale residual decoder 710 or the prediction residual decoder 730, on the other hand, is different for training and test. At the test stage, the scale residual decoder 710 or the prediction residual decoder 730 is an actual decoder, including an entropy decoder followed by a dequantizer. While at the training stage, the scale residual decoder 710 or the prediction residual decoder 730 is skipped.

This disclosure does not put any restrictions on methods used for the neural scale residual encoder 610, the scale residual encoder 620, the scale residual decoder 710, the neural scale residual decoder 720, the neural prediction residual encoder 630, the prediction residual encoder 640, the prediction residual decoder 730, or the neural prediction residual decoder 740. In other words, the NIC framework of this disclosure can accommodate different types of the scale residual encoding DNN, scale residual decoding DNN, prediction residual encoding DNN, and prediction residual decoding DNN.

In embodiments, a rate loss $R(\hat{r}, \hat{r}')$ is further decomposed into:

$$R(\hat{r},\hat{r}') = R(\hat{r}) + \rho R(\hat{r}') \quad (2),$$

where each $R(\hat{r})$ and $R(\hat{r}')$ are rate losses related to bitrates of compressed representations $\hat{r}$ and $\hat{r}'$, respectively. A hyperparameter $\rho$ balances contributions of different loss terms. In embodiments, an entropy estimation approach is used to compute these rate losses $R(\hat{r})$ and $R(\vec{r}')$, in which a DNN rate loss estimator is used (learned in the training stage and deployed in the test stage).

Also, a regularization loss $E(\hat{r}, \bar{r}, \hat{r}', \bar{r}')$ is further decomposed into:

$$E(\hat{r},\bar{r},\hat{r}',\bar{r}') = E(\hat{r},\bar{r}) + \gamma E(\hat{r}',\bar{r}') \quad (3),$$

where each $E(\hat{r}, \bar{r})$ or $E(\hat{r}', \bar{r}')$ measures a reconstruction error (e.g., a mean squared error (MSE) loss) of a recovered residual $\bar{r}$ or $\bar{r}'$ compared to the residual $\hat{r}$ or $\hat{r}'$ before the DNN scale residual encoding or the prediction residual encoding. A hyperparameter $\gamma$ balances contributions of different loss terms. Based on both Equation (2) and Equation (3), for each training image x, an overall loss of Equation (1) can be computed. Gradients of the overall loss of Equation (1) can then be computed, based on which weight coefficients of learnable DNNs will be updated through backpropagation.

In embodiments of a learning process, the downsampling DNN, the prediction DNN, the scale residual encoding DNN, the prediction residual encoding DNN, the upsampling DNN, the scale residual decoding DNN, and the prediction residual decoding DNN can be updated together based on the above back-propagated gradients in an end-to-end (E2E) fashion. Also, any of these DNNs can be learned individually. For example, the downsampling DNN and the upsampling DNN can be individually trained using some dataset (the same as or different from the dataset used in the above training process), and they can be fixed in the above training process in which only weight coefficients of remaining DNNs are updated.

Figure 8:
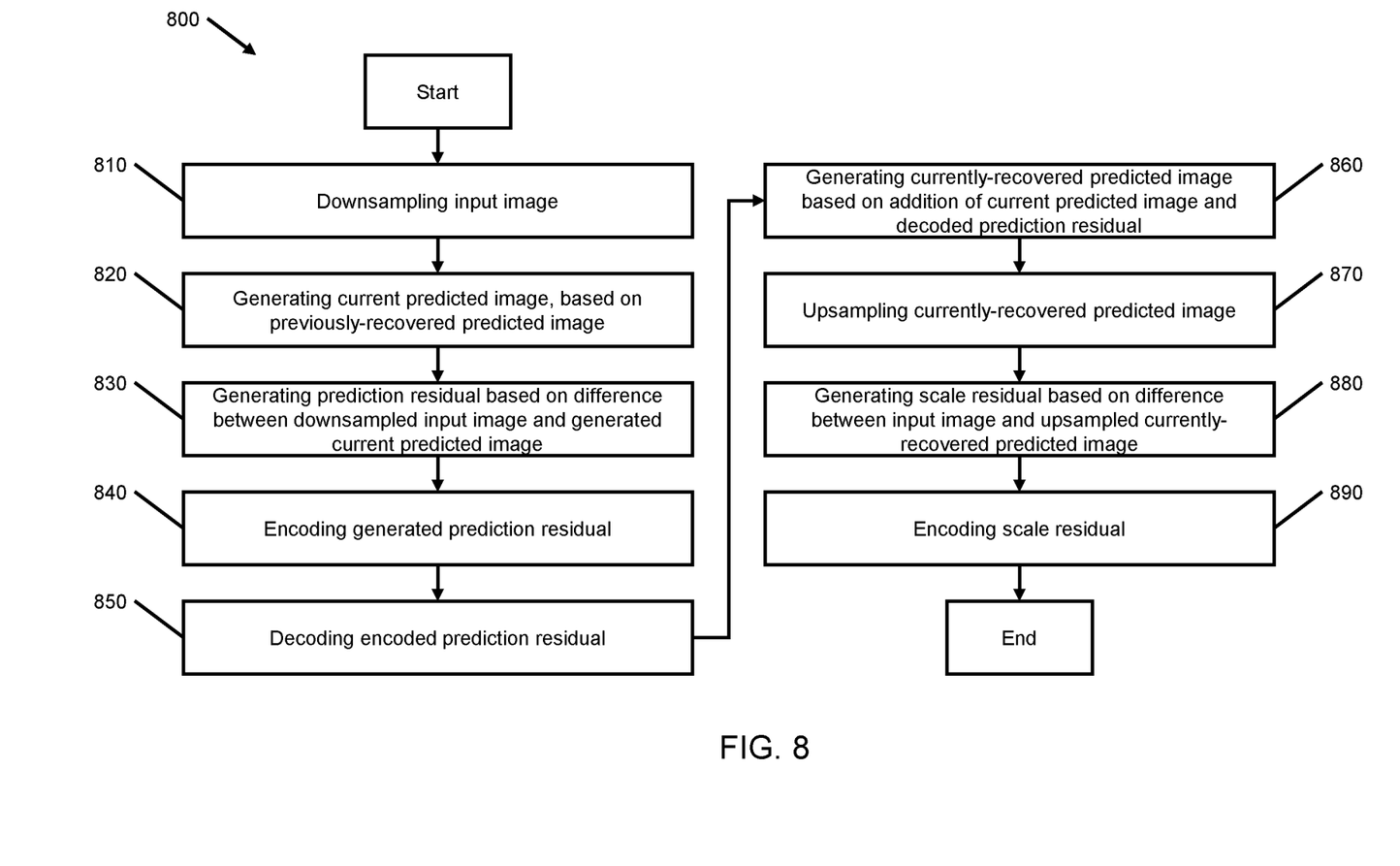
FIG. 8 is a flowchart of a method of multi-scale neural image compression with intra-prediction residuals, according to embodiments.

FIG. 8 is a flowchart of a method 800 of multi-rate neural image compression with intra-prediction residuals, according to embodiments.

In some implementations, one or more process blocks of FIG. 8 may be performed by the platform 120. In some implementations, one or more process blocks of FIG. 8 may be performed by another device or a group of devices separate from or including the platform 120, such as the user device 110.

As shown in FIG. 8, in operation 810, the method 800 includes downsampling an input image.

In operation 820, the method 800 includes generating a current predicted image, based on a previously-recovered predicted image.

In operation 830, the method 800 includes generating a prediction residual based on a difference between the downsampled input image and the generated current predicted image.

In operation 840, the method 800 includes encoding the generated prediction residual.

In operation 850, the method 800 includes decoding the encoded prediction residual.

In operation 860, the method 800 includes generating a currently-recovered predicted image based on an addition of the current predicted image and the decoded prediction residual.

In operation 870, the method 800 includes upsampling the currently-recovered predicted image.

In operation 880, the method 800 includes generating a scale residual based on a difference between the input image and the upsampled currently-recovered predicted image.

In operation 890, the method 800 includes encoding the scale residual.

The method 800 may further include decoding the encoded scale residual, and generating a reconstructed image based on an addition of the upsampled currently-recovered predicted image and the decoded scale residual.

The downsampling the input image, the generating the current predicted image, the encoding the generated prediction residual, the decoding the encoded prediction residual, the upsampling the currently-recovered predicted image, the encoding the scale residual, and the decoding the encoded scale residual may use neural networks, respectively.

The neural network may be trained by determining a regularization loss based on a reconstruction error between the decoded scale residual and the encoded scale residual and a reconstruction error between the decoded prediction residual and the encoded prediction residual, and updating weight coefficients of the neural networks, to minimize the determined regularization loss.

The neural networks may be further trained by determining a distortion loss based on the input image and the reconstructed image, and determining a rate loss based on bitrates of the encoded scale residual and the encoded prediction residual. The updating the weight coefficients may include updating the weight coefficients of the neural networks, to minimize the determined distortion loss, the determined rate loss and the determined regularization loss.

The generating the current predicted image may include generating a current predicted block, based on a set of previously-recovered predicted blocks of the previously-recovered predicted image. The generating the prediction residual may include generating a prediction residual block based on a difference between the generated current predicted block and a true image block of the downsampled input image.

The encoding the generated prediction residual may include encoding the generated prediction residual block, and the decoding the encoded prediction residual may include decoding the encoded the prediction residual block.

Although FIG. 8 shows example blocks of the method 800, in some implementations, the method 800 may include additional blocks, fewer blocks, different blocks, or differently arranged blocks than those depicted in FIG. 8. Additionally, or alternatively, two or more of the blocks of the method 800 may be performed in parallel.

Figure 9:
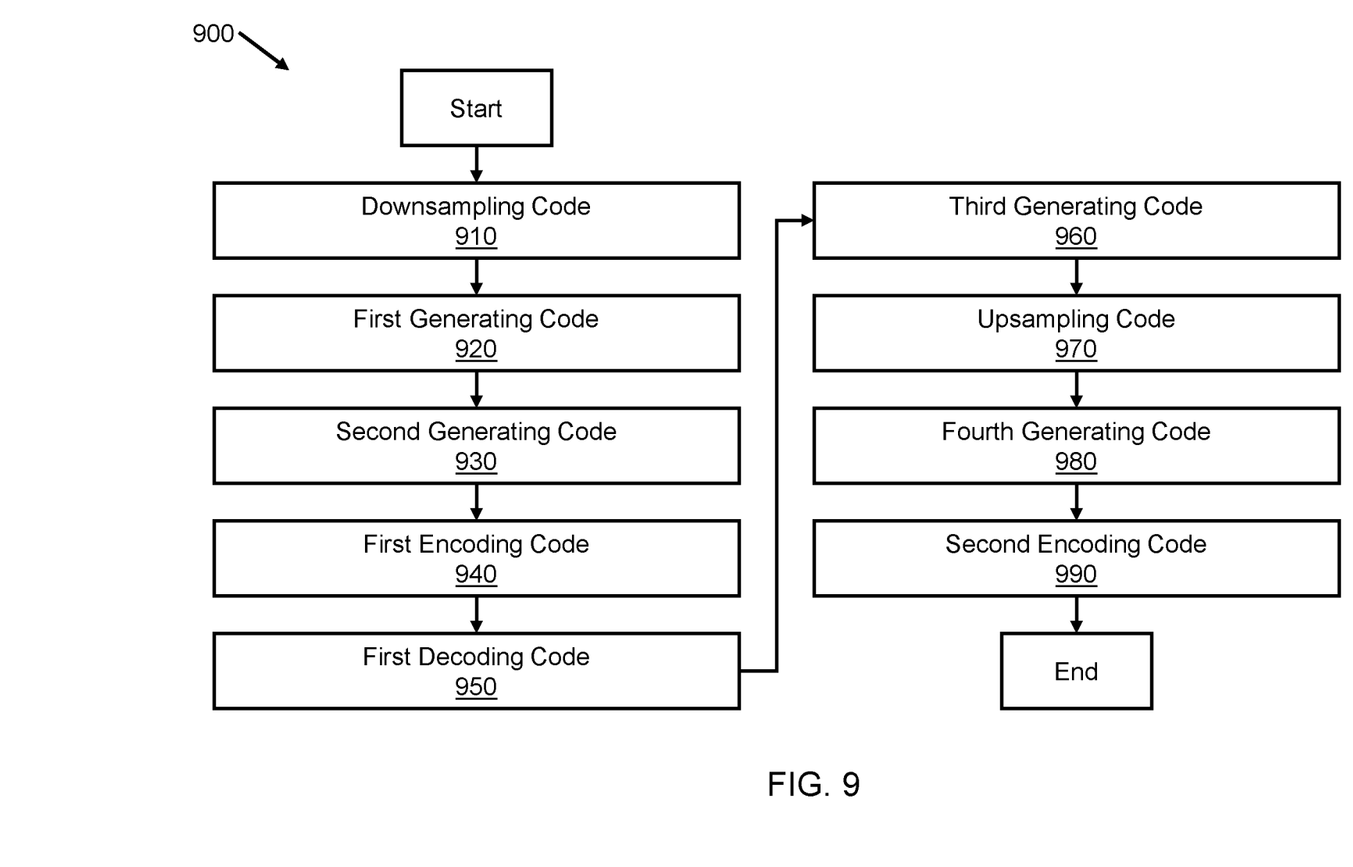
FIG. 9 is a block diagram of an apparatus for multi-scale neural image compression with intra-prediction residuals, according to embodiments.

FIG. 9 is a block diagram of an apparatus 900 for multi-rate neural image compression with intra-prediction residuals, according to embodiments.

As shown in FIG. 9, the apparatus 900 includes downsampling code 910, first generating code 920, second generating code 930, first encoding code 940, first decoding code 950, third generating code 960, upsampling code 970, fourth generating code 980 and second encoding code 990.

The downsampling code 910 is configured to cause at least one processor to downsample an input image.

The first generating code 920 is configured to cause the at least one processor to generate a current predicted image, based on a previously-recovered predicted image.

The second generating code 930 is configured to cause the at least one processor to generate a prediction residual based on a difference between the downsampled input image and the generated current predicted image.

The first encoding code 940 is configured to cause the at least one processor to encode the generated prediction residual.

The first decoding code 950 is configured to cause the at least one processor to decode the encoded prediction residual.

The third generating code 960 is configured to cause the at least one processor to generate a currently-recovered predicted image based on an addition of the current predicted image and the decoded prediction residual.

The upsampling code 970 is configured to cause the at least one processor to upsample the currently-recovered predicted image.

The fourth generating code 980 is configured to cause the at least one processor to generate a scale residual based on a difference between the input image and the upsampled currently-recovered predicted image.

The second encoding code 990 is configured to cause the at least one processor to encode the scale residual.

The program code may further include second decoding code configured to cause the at least one processor to decode the encoded scale residual, and fifth generating code configured to cause the at least one processor to generate a reconstructed image based on an addition of the upsampled currently-recovered predicted image and the decoded scale residual.

The downsampling code 910, the first generating code 920, the first encoding code 940, the first decoding code 950, the upsampling code 970, the second encoding code 990, and the second decoding code may use neural networks, respectively.

The neural networks may be trained by determining a regularization loss based on a reconstruction error between the decoded scale residual and the encoded scale residual and a reconstruction error between the decoded prediction residual and the encoded prediction residual, and updating weight coefficients of the neural networks, to minimize the determined regularization loss.

The neural networks may be further trained by determining a distortion loss based on the input image and the reconstructed image, and determining a rate loss based on bitrates of the encoded scale residual and the encoded prediction residual. The updating the weight coefficients may include updating the weight coefficients of the neural networks, to minimize the determined distortion loss, the determined rate loss and the determined regularization loss.

The first generating code 920 may be further configured to cause the at least one processor to generate a current predicted block, based on a set of previously-recovered predicted blocks of the previously-recovered predicted image, and the second generating code 930 may be further configured to cause the at least one processor to generate a prediction residual block based on a difference between the generated current predicted block and a true image block of the downsampled input image.

The first encoding code 940 may be further configured to cause the at least one processor to encode the generated prediction residual block, and the first decoding code 950 may be further configured to cause the at least one processor to decode the encoded the prediction residual block.

Comparing with the previous E2E image compression methods, the embodiments described herein have the following benefits. The embodiments exploit two mechanisms to improve the NIC coding efficiency: encoding residuals between prediction blocks and the original blocks instead of encoding the original pixels; and using different coding strategies at different scales. The embodiments include a flexible framework that accommodates different intra-prediction methods and different neural encoding methods for residuals from the scaling process and residuals from the intra-prediction process. The embodiments further include a flexible framework that accommodates various types of quality metrics.

The methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of multi-scale neural image compression with intra-prediction residuals, the method being performed by at least one processor, and the method comprising:
   downsampling an input image;
   generating a current predicted image, based on a previously-recovered predicted image;
   generating a prediction residual based on a difference between the downsampled input image and the generated current predicted image;
   encoding the generated prediction residual;
   decoding the encoded prediction residual;
   generating a currently-recovered predicted image based on an addition of the current predicted image and the decoded prediction residual;
   upsampling the currently-recovered predicted image;
   generating a scale residual based on a difference between the input image and the upsampled currently-recovered predicted image; and
   encoding the scale residual,
   wherein the encoding of the generated prediction residual and the decoding of the encoded prediction residual use at least one neural network, and
   wherein the at least one neural network is trained by determining a regularization loss based on a reconstruction error between the decoded prediction residual and the encoded prediction residual and updating weight coefficients of the at least one neural network, to minimize the determined regularization loss.

2. The method of claim 1, further comprising:
   decoding the encoded scale residual; and
   generating a reconstructed image based on an addition of the upsampled currently-recovered predicted image and the decoded scale residual.

3. The method of claim 2, wherein the downsampling the input image, the generating the current predicted image, the encoding the generated prediction residual, the decoding the encoded prediction residual, the upsampling the currently-recovered predicted image, the encoding the scale residual, and the decoding the encoded scale residual use neural networks, respectively.

4. The method of claim 3, wherein the neural networks are trained by:
   determining the regularization loss based on a reconstruction error between the decoded scale residual and the encoded scale residual and the reconstruction error between the decoded prediction residual and the encoded prediction residual; and
   updating weight coefficients of the neural networks, to minimize the determined regularization loss.

5. The method of claim 4, wherein the neural networks are further trained by:
   determining a distortion loss based on the input image and the reconstructed image; and
   determining a rate loss based on bitrates of the encoded scale residual and the encoded prediction residual, and
   wherein the updating the weight coefficients comprises updating the weight coefficients of the neural networks, to minimize the determined distortion loss, the determined rate loss and the determined regularization loss.

6. The method of claim 1, wherein the generating the current predicted image comprises generating a current predicted block, based on a set of previously-recovered predicted blocks of the previously-recovered predicted image, and wherein the generating the prediction residual comprises generating a prediction residual block based on a difference between the generated current predicted block and a true image block of the downsampled input image.

7. The method of claim 6, wherein the encoding the generated prediction residual comprises encoding the generated prediction residual block, and wherein the decoding the encoded prediction residual comprises decoding the encoded the prediction residual block.

8. An apparatus for multi-scale neural image compression with intra-prediction residuals, the apparatus comprising:

at least one memory configured to store program code; and at least one processor configured to read the program code and operate as instructed by the program code, the program code comprising:

downsampling code configured to cause the at least one processor to downsample an input image;

first generating code configured to cause the at least one processor to generate a current predicted image, based on a previously-recovered predicted image;

second generating code configured to cause the at least one processor to generate a prediction residual based on a difference between the downsampled input image and the generated current predicted image;

first encoding code configured to cause the at least one processor to encode the generated prediction residual;

first decoding code configured to cause the at least one processor to decode the encoded prediction residual;

third generating code configured to cause the at least one processor to generate a currently-recovered predicted image based on an addition of the current predicted image and the decoded prediction residual;

upsampling code configured to cause the at least one processor to upsample the currently-recovered predicted image;

fourth generating code configured to cause the at least one processor to generate a scale residual based on a difference between the input image and the upsampled currently-recovered predicted image; and second encoding code configured to cause the at least one processor to encode the scale residual, wherein the encoding of the generated prediction residual and the decoding of the encoded prediction residual use at least one neural network, and wherein the at least one neural network is trained by determining a regularization loss based on a reconstruction error between the decoded prediction residual and the encoded prediction residual and updating weight coefficients of the at least one neural network, to minimize the determined regularization loss.

9. The apparatus of claim 8, wherein the program code further comprises:

second decoding code configured to cause the at least one processor to decode the encoded scale residual; and fifth generating code configured to cause the at least one processor to generate a reconstructed image based on an addition of the upsampled currently-recovered predicted image and the decoded scale residual.

10. The apparatus of claim 9, wherein the downsampling code, the first generating code, the first encoding code, the first decoding code, the upsampling code, the second encoding code, and the second decoding code use neural networks, respectively.

11. The apparatus of claim 10, wherein the neural networks are trained by:

determining the regularization loss based on a reconstruction error between the decoded scale residual and the encoded scale residual and the reconstruction error between the decoded prediction residual and the encoded prediction residual; and updating weight coefficients of the neural networks, to minimize the determined regularization loss.

12. The apparatus of claim 11, wherein the neural networks are further trained by:

determining a distortion loss based on the input image and the reconstructed image; and determining a rate loss based on bitrates of the encoded scale residual and the encoded prediction residual, and wherein the updating the weight coefficients comprises updating the weight coefficients of the neural networks, to minimize the determined distortion loss, the determined rate loss and the determined regularization loss.

13. The apparatus of claim 8, wherein the first generating code is further configured to cause the at least one processor to generate a current predicted block, based on a set of previously-recovered predicted blocks of the previously-recovered predicted image, and wherein the second generating code is further configured to cause the at least one processor to generate a prediction residual block based on a difference between the generated current predicted block and a true image block of the downsampled input image.

14. The apparatus of claim 13, wherein the first encoding code is further configured to cause the at least one processor to encode the generated prediction residual block, and wherein the first decoding code is further configured to cause the at least one processor to decode the encoded the prediction residual block.

15. A non-transitory computer-readable medium storing instructions that, when executed by at least one processor for multi-scale neural image compression with intra-prediction residuals, cause the at least one processor to:

downsample an input image;

generate a current predicted image, based on a previously-recovered predicted image;

generate a prediction residual based on a difference between the downsampled input image and the generated current predicted image;

encode the generated prediction residual;

decode the encoded prediction residual;

generate a currently-recovered predicted image based on an addition of the current predicted image and the decoded prediction residual;

upsample the currently-recovered predicted image;

generate a scale residual based on a difference between the input image and the upsampled currently-recovered predicted image; and encode the scale residual, wherein the encoding of the generated prediction residual and the decoding of the encoded prediction residual use at least one neural network, and wherein the at least one neural network is trained by determining a regularization loss based on a reconstruction error between the decoded prediction residual and the encoded prediction residual and updating weight coefficients of the at least one neural network, to minimize the determined regularization loss.

16. The non-transitory computer-readable medium of claim 15, wherein the instructions, when executed by the at least one processor, further cause the at least one processor to:
   decode the encoded scale residual; and
   generate a reconstructed image based on an addition of the upsampled currently-recovered predicted image and the decoded scale residual.

17. The non-transitory computer-readable medium of claim 16, wherein the downsampling the input image, the generating the current predicted image, the encoding the generated prediction residual, the decoding the encoded prediction residual, the upsampling the currently-recovered predicted image, the encoding the scale residual, and the decoding the encoded scale residual use neural networks, respectively.

18. The non-transitory computer-readable medium of claim 17, wherein the neural networks are trained by:
   determining the regularization loss based on a reconstruction error between the decoded scale residual and the encoded scale residual and the reconstruction error between the decoded prediction residual and the encoded prediction residual; and
   updating weight coefficients of the neural networks, to minimize the determined regularization loss.

19. The non-transitory computer-readable medium of claim 15, wherein the instructions, when executed by the at least one processor, further cause the at least one processor to:
   generate a current predicted block, based on a set of previously-recovered predicted blocks of the previously-recovered predicted image; and
   generate a prediction residual block based on a difference between the generated current predicted block and a true image block of the downsampled input image.

20. The non-transitory computer-readable medium of claim 19, wherein the instructions, when executed by the at least one processor, further cause the at least one processor to:
   encode the generated prediction residual block; and
   decode the encoded the prediction residual block.

* * * * *